United States Patent
Seibold et al.

(10) Patent No.: US 12,086,939 B1
(45) Date of Patent: Sep. 10, 2024

(54) AUTOMATIC GENERATION OF CURVATURE ALIGNED SUBDIVISION SURFACES FROM FACETED GEOMETRY

(71) Applicant: Ansys, Inc., Canonsburg, PA (US)

(72) Inventors: Wolfgang Seibold, Lafayette, CO (US); Matthias Messner, Eldorado Springs, CO (US)

(73) Assignee: Ansys, Inc., Canonsburg, PA (US)

( * ) Notice: Subject to any disclaimer, the term of this patent is extended or adjusted under 35 U.S.C. 154(b) by 198 days.

(21) Appl. No.: 17/680,800

(22) Filed: Feb. 25, 2022

(51) Int. Cl.
*G06T 17/20* (2006.01)
*G06T 19/00* (2011.01)

(52) U.S. Cl.
CPC ............ *G06T 17/205* (2013.01); *G06T 19/00* (2013.01); *G06T 2210/36* (2013.01)

(58) Field of Classification Search
CPC .... G06T 17/205; G06T 19/00; G06T 2210/36
See application file for complete search history.

(56) References Cited

U.S. PATENT DOCUMENTS

| | | | |
|---|---|---|---|
| 9,147,288 B1* | 9/2015 | Johnston | G06T 17/00 |
| 9,824,493 B1* | 11/2017 | Chen | G06T 17/205 |
| 2005/0114099 A1* | 5/2005 | Boier-Martin | G06T 17/205 |
| | | | 703/2 |
| 2006/0158450 A1* | 7/2006 | Ferguson | G06T 13/00 |
| | | | 345/423 |
| 2010/0091018 A1* | 4/2010 | Tatarchuk | G06T 15/005 |
| | | | 345/473 |
| 2016/0078662 A1* | 3/2016 | Herman | G06T 13/20 |
| | | | 345/473 |
| 2017/0206705 A1* | 7/2017 | De Goes | G06T 17/205 |
| 2020/0150624 A1* | 5/2020 | Marinov | G06F 30/00 |
| 2021/0232120 A1* | 7/2021 | Marinov | B23Q 3/16 |

* cited by examiner

*Primary Examiner* — Michael Le
(74) *Attorney, Agent, or Firm* — Jones Day

(57) ABSTRACT

Data is received that includes a triangular mesh. Thereafter, a curvature aligned cross field is generated on the triangular mesh. The cross field is used to calculate a quad layout. A subdivision surface can be created using the quad layout as a control cage. Later, vertex locations in the control cage are determined to result in the subdivision surface being an approximation of the triangular mesh. The subdivision subsurface (or a portion thereof) can be visualized in a graphical user interface (e.g., as part of a CAD software application, etc.). Related apparatus, systems, techniques and articles are also described.

20 Claims, 14 Drawing Sheets

AUTOMATIC GENERATION OF CURVATURE ALIGNED SUBDIVISION SURFACES FROM FACETED GEOMETRY

TECHNICAL FIELD

The subject matter described herein relates to enhanced computer-aided design (CAD) techniques for automatically generating subdivision surfaces from a faceted geometry.

BACKGROUND

Subdivision surfaces are commonly used in character animation due to their ease of modeling complex geometry. Subdivision surfaces are smooth surfaces and are defined by an underlying control cage which can be easily deformed or manipulated by moving the locations of the vertices of the control cage.

Subdivision surfaces are generally created by hand in a CAD software application, requiring a user to define the control cage, even if there is an existing geometry like a triangular mesh. These processes are inefficient and so there is a need to automatically generate a subdivision surface from faceted data which is curvature aligned.

SUMMARY

In a first aspect, data is received that includes a triangular mesh. Thereafter, a curvature aligned cross field is generated on the triangular mesh. The cross field is used to calculate a quad layout which constitutes the control cage of a subdivision surface. Later, vertex locations in the control cage are determined so that the subdivision surface optimally approximates the triangular mesh. The subdivision surface (or a portion thereof) can be visualized in a graphical user interface (e.g., as part of a CAD software application, etc.).

The initial quad layout (constituting the control cage of the subdivision surface) can be refined iteratively until a desired approximation tolerance is obtained. In some variations, for each iteration, one or more vertices can be added to the control cage and the quad layout is being updated accordingly. The vertex insertion can either happen (1) automatically, or (2) interactively (e.g., via user-generated input in a graphical user interface). With the former, the optimal set of new vertex locations can be computed in order to achieve the given approximation tolerance in as few iterations as possible. Further, in some variations, the user can specify new vertex locations via the graphical user interface. The subdivision surface can based on the Catmull-Clark subdivision scheme.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides improvement to CAD software applications by automatically generating surfaces that are curvature aligned to minimize the number of patches needed to accurately represent an input geometry.

The details of one or more variations of the subject matter described herein are set forth in the accompanying drawings and the description below. Other features and advantages of the subject matter described herein will be apparent from the description and drawings, and from the claims.

DETAILED DESCRIPTION

Given a smooth faceted input geometry and a user specified tolerance, techniques are provided herein that produce a control cage (e.g., a control cage defining a Catmull-Clark subdivision surface) without additional user interaction by way of a graphical user interface of a CAD software application. The generated surfaces using the techniques herein are curvature aligned to minimize the number of patches needed to accurately represent the input geometry. Such advances are particularly useful in rendering animated movement of objects forming part of the input geometry.

Figure 1:
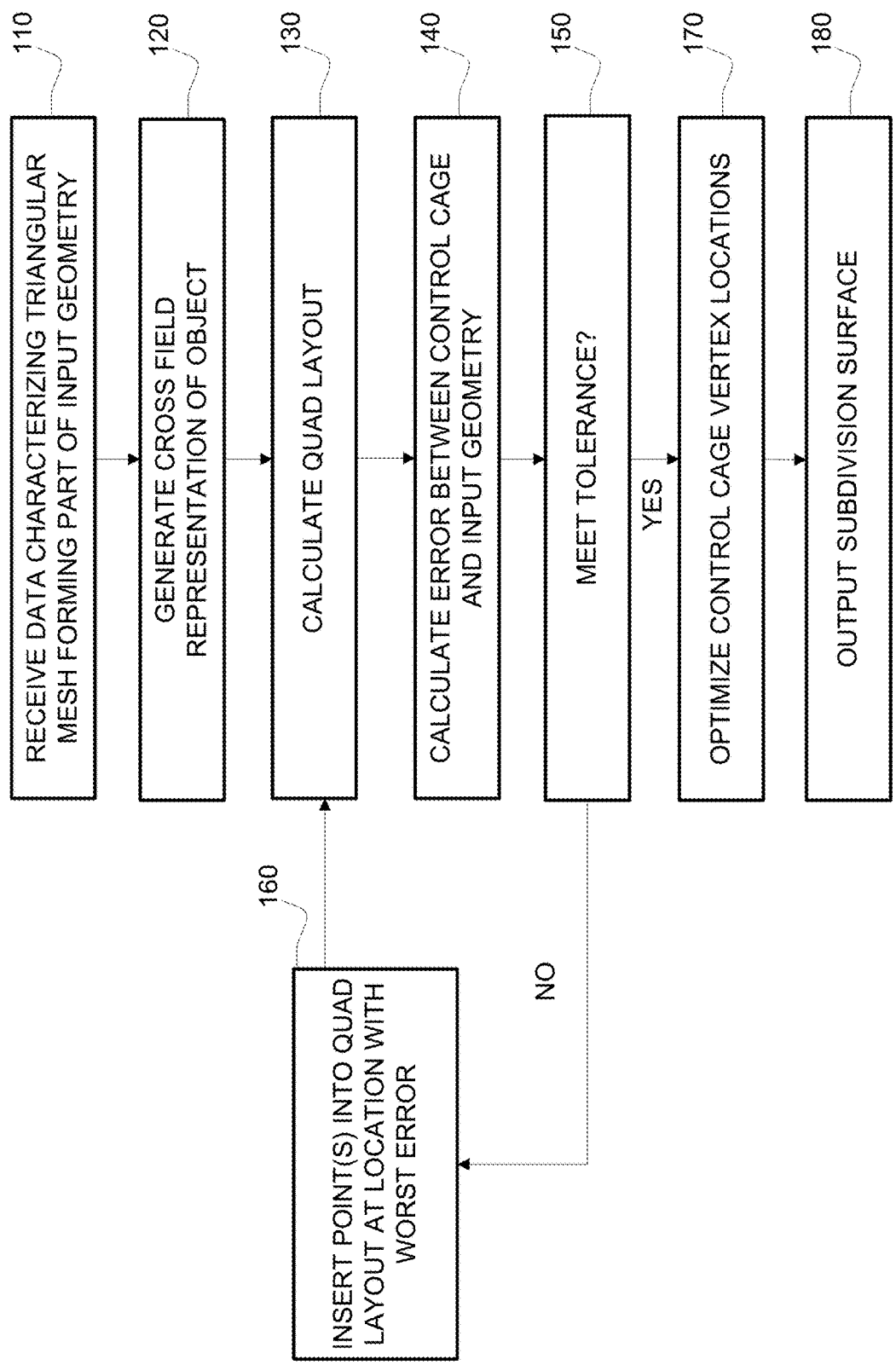
FIG. 1 is a first process flow diagram illustrating the generation of curvature aligned subdivision surfaces from an input faceted geometry.

FIG. 1 is a process flow diagram 100 illustrating a technique for automatically generating curvature aligned subdivision surfaces from a faceted geometry as part of a CAD software program. FIGS. 2-12 are diagrams 200-1200 illustrating example graphical user interface (GUI) views animating an object (e.g., a femur, etc.).

Referring again to FIG. 1, initially, at 110, data is received that characterizes or otherwise specifies an input geometry. This input geometry characterizes and can include a triangular mesh representation of the object. It will be appreciated that the current subject matter is applicable to input geometries formed from a series of objects and that references to a single object (unless otherwise specified) are for illustrative purposes only. Thereafter, at 120, a cross field representation of the object is generated. The cross field in general is aligned to the principal curvature directions of the triangular mesh and to the boundary for open triangulated meshes. To ensure a smooth cross field, the field can deviate from the principal curvature directions of the triangles. A smoother field has less singularities (i.e., isolated points in which fields fail to vary smoothly) and will produce a subdivision surface model with less patches because the singularities of the cross field are going to be vertices in the control cage of the subdivision surface model. Here, singularities, such as sources and sinks, are automatically placed in locations that allow the field to achieve optimal smoothness. Such fields can then be used for a wide variety of computer graphics and geometry processing operations such as surface parameterization, quad meshing, architectural geometry, anisotropic shading, and texture synthesis.

Based on the generated cross field, at 130, a quad layout can be calculated which constitutes the control cage of the subdivision surface. This results in a quad layout on top of the triangular mesh, with connections or arcs between singularities. These arcs need to be field aligned but can drift some from the exact field direction. This is necessary so that arcs between singularities can be traced (which in some variations can allow for a certain amount of drift). All possible arcs between singularities can be computed in parallel. To find an optimal quad layout a mixed integer problem must be solved that yields an initial quad layout which can contain T-junctions. The subdivision surface can, in some variations, be based on the Catmull-Clark subdivision scheme. Implementation details of how to compute a quad layout from a triangular mesh using a cross field can also be found in Pietroni et al. "Tracing Field-Coherent Quad Layouts" Pacific Graphics, Volume 35, Number 7 (2016), the contents of which are hereby fully incorporated by reference.

The subdivision surface can then be analyzed, at 140, to calculate an error between the control cage and input geometry. This error can, for example, relate to a distance (e.g., a maximal distance, etc.) between the control cage and the triangular mesh. It is then determined, at 150, whether the error (e.g., distance, etc.) is within a predefined tolerance (i.e., distance or other threshold). The tolerance can be specified, in some cases, via user-defined input into a GUI of the CAD software program. In other cases, a default tolerance can be utilized. If the error is outside the tolerance, then, at 160, the quad layout can be augmented by adding one or more points at a location with the worst error (i.e., the largest value). Optionally, points to the quad layout can also be inserted by the user via the GUI of the CAD software program. If the error is within the tolerance, then, at 170, the locations of the vertices on the control cage can be optimized or determined relative to the triangular mesh (i.e., the input faceted geometry). Thereafter, at 180, the subdivision surface can be outputted (which can be displayed in a GUI, etc.). The point of worst error can then be added as a user-defined point to the cross field and a new quad layout can be computed. The above operations can be iterated until such time that an error within a tolerance is obtained.

Figure 2:
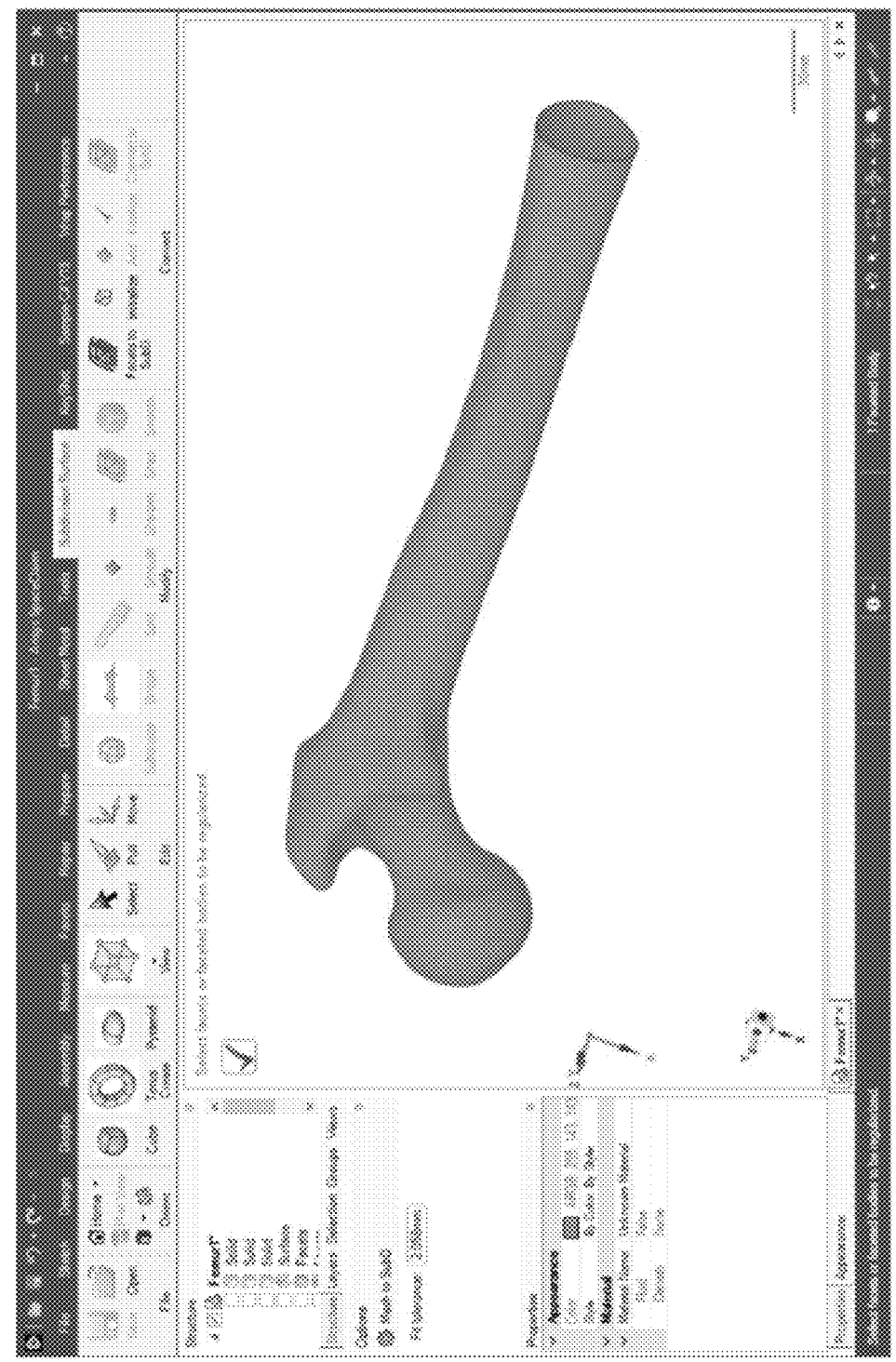
FIGS. 2-12 are views of a CAD software application for implementing aspects of FIG. 1.
Figure 3:
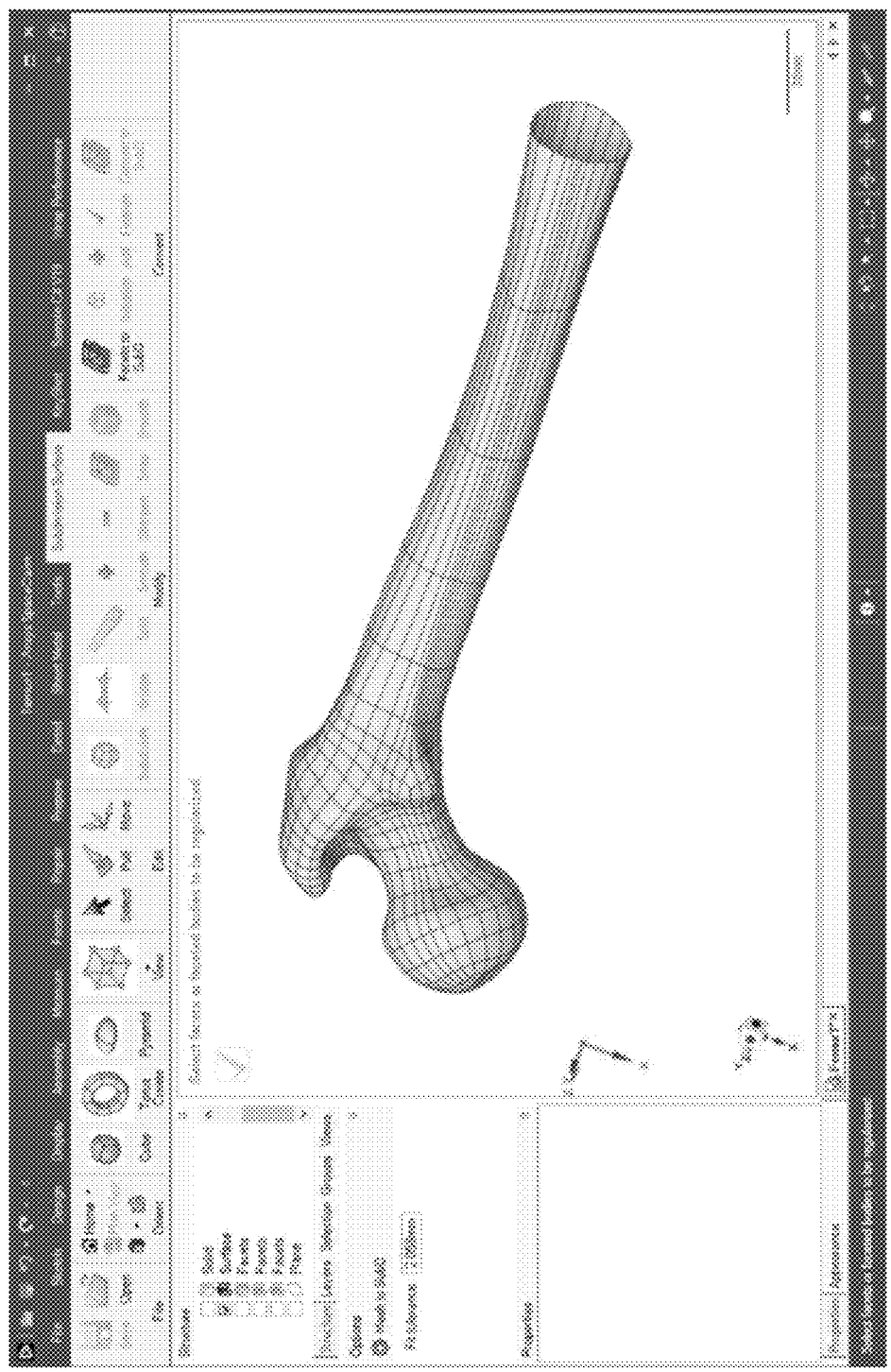
Figure 4:
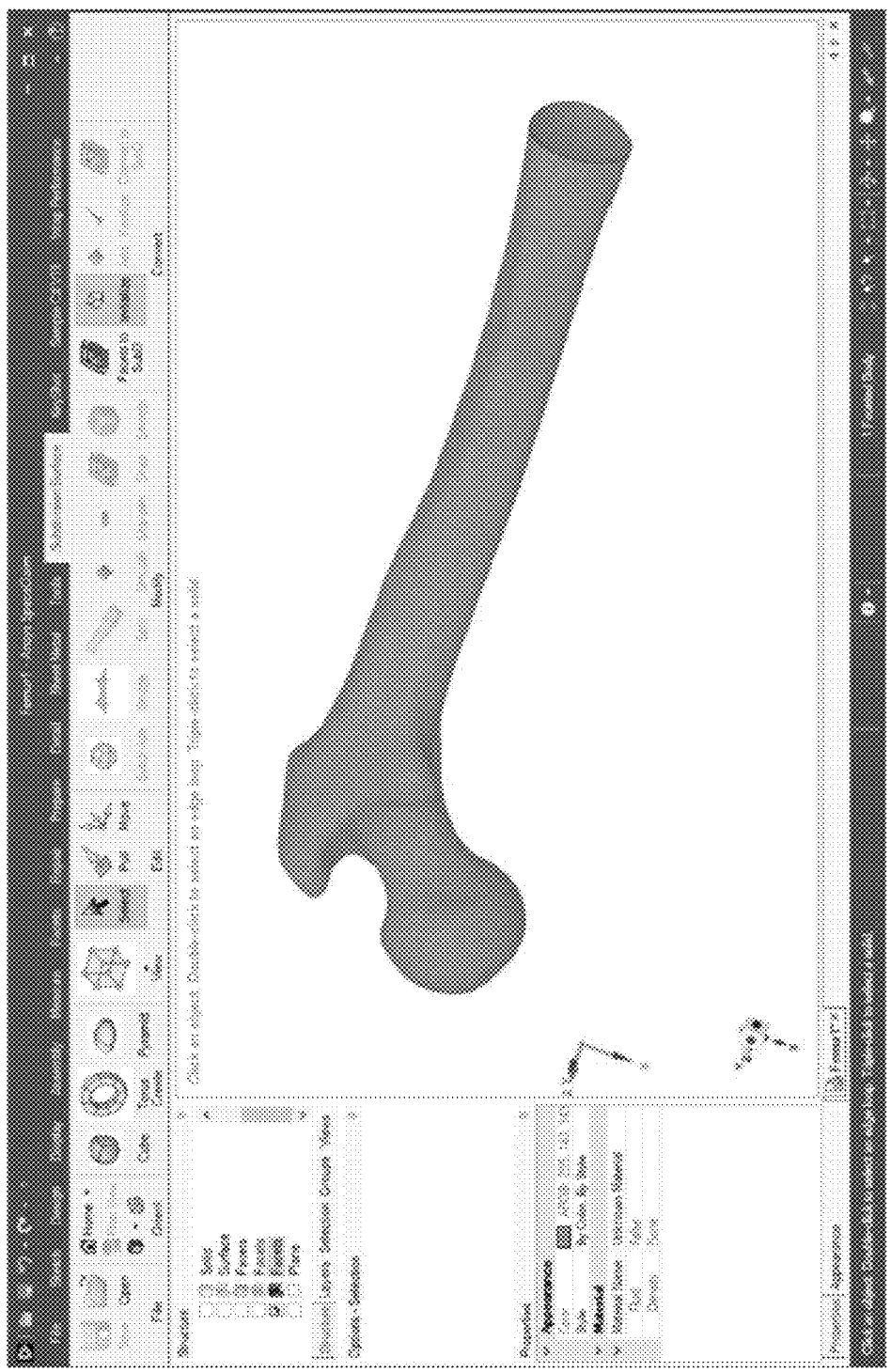
Figure 5:
Figure 6:
Figure 7:
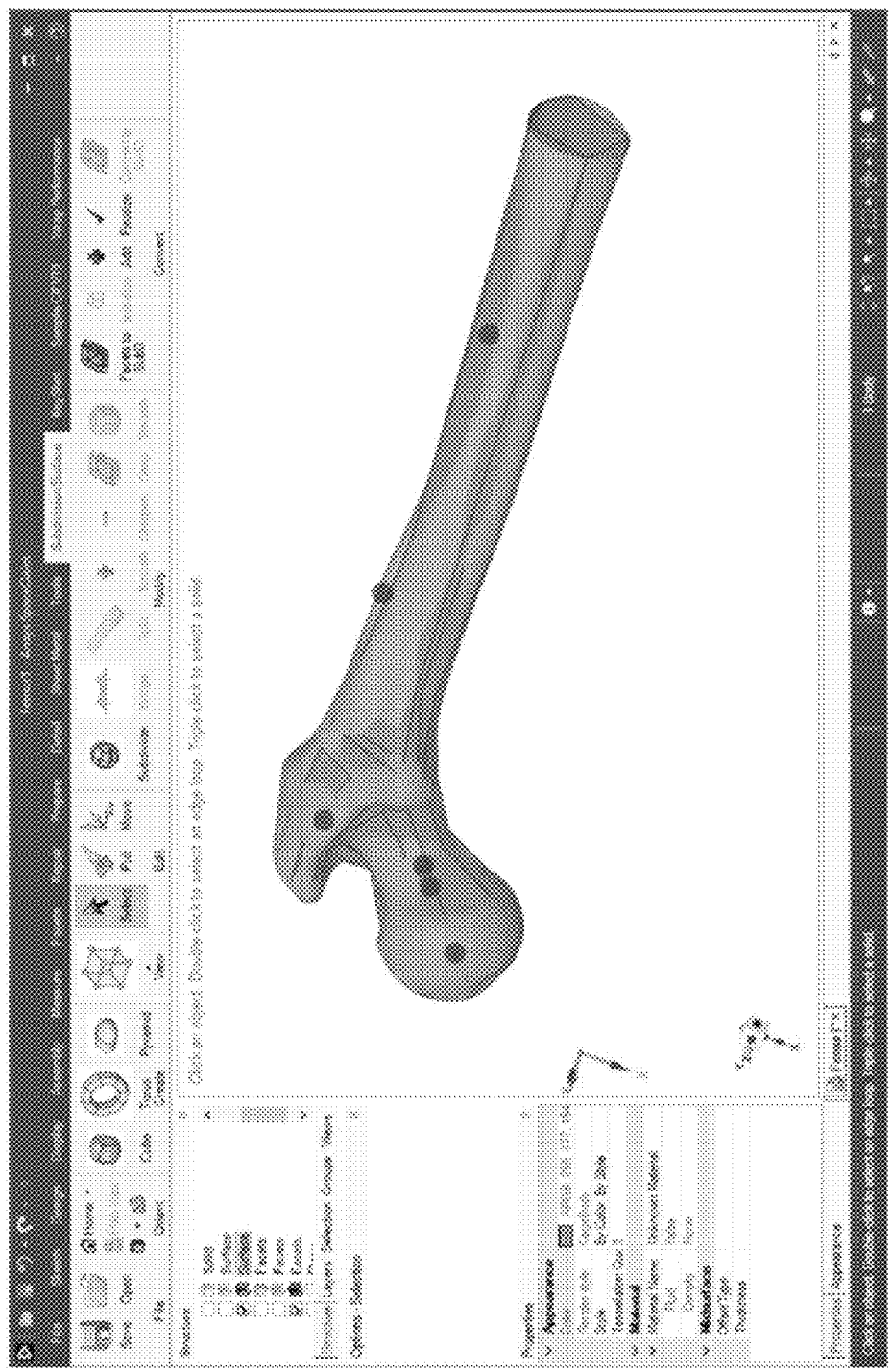
Figure 8:
Figure 9:
Figure 10:
Figure 11:
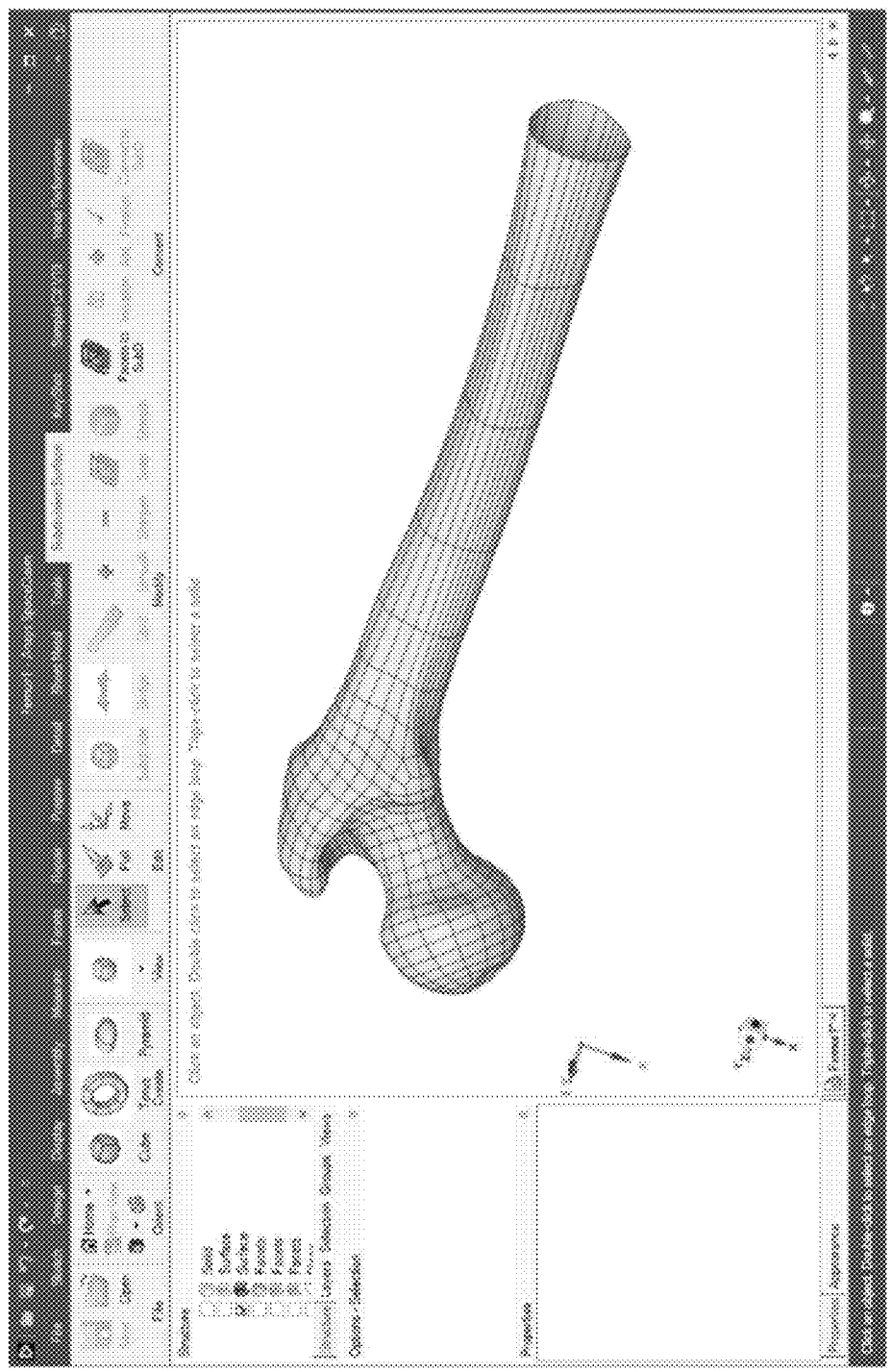
Figure 12:
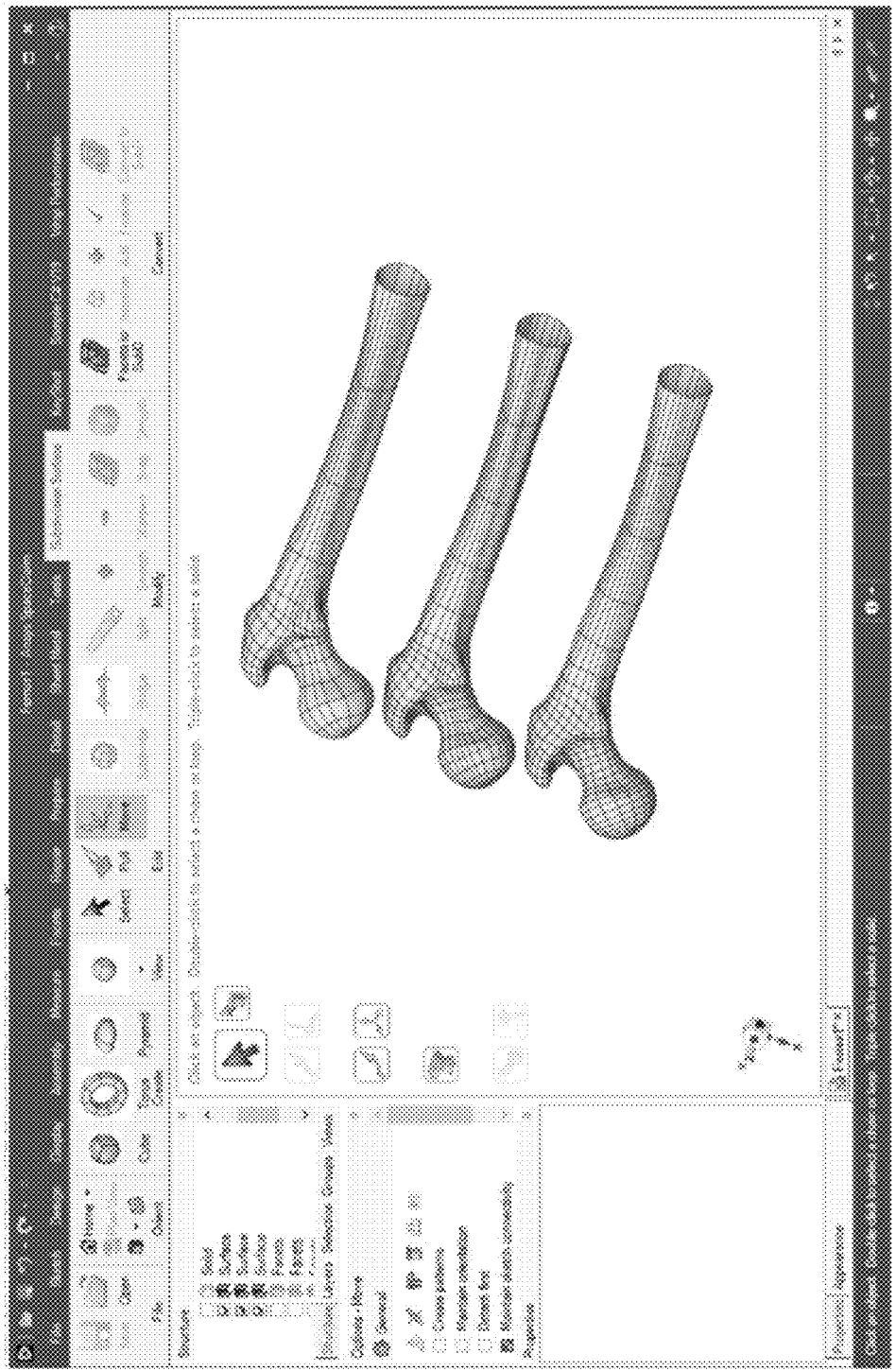

As noted above, FIGS. 2-12 show various views of a GUI of a CAD software program modeling a femur. The GUI can include a plurality of controls which, when activated, can allow a user to manipulate the object(s) being modeled. FIG. 2 is a view that illustrates the selection of a faceted model. Further, in this regard, the user can specify the desired tolerance (here referred to as a fit tolerance). FIG. 3 is a view that illustrates the selection of where new subdivision control cage vertices are to be inserted. FIG. 4 is a view that illustrates the initiation of the generation of a minimal topology. FIG. 5 is a view that illustrates the results after the initialization in which the dots show a maximum error location to add in a new subdivision control vertex. FIG. 6 is a view that illustrates the subdivision surface being generated in a manner such that the control points are on the faceted geometry. FIG. 7 illustrates a view in which multiple vertices can be simultaneously added to the control cage. FIGS. 8 and 9 both illustrate a view showing the results of a particular vertex addition. FIG. 10 illustrates a view showing the additional vertex on the control cage after the subdivision surface has been smoothed. FIG. 11 illustrates a view in which the user guided insertion is finalized such that the control cage vertex locations are optimized such that the subdivision surface is interpolating the input faceted geometry. FIG. 12 illustrates a view in which different fitting results for the same objects are displayed.

Figure 13:
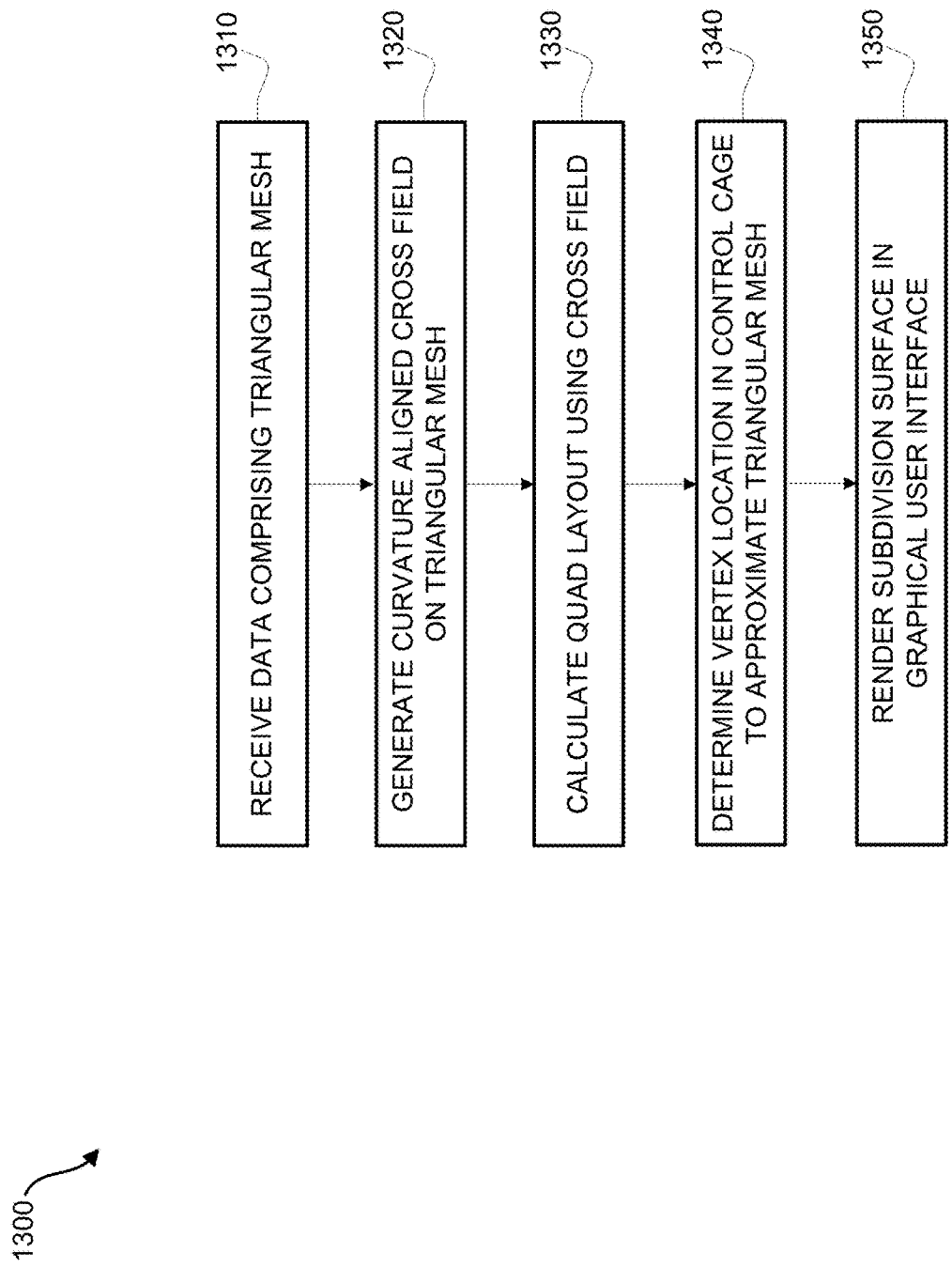
FIG. 13 is a second process flow diagram illustrating the generation of curvature aligned subdivision surfaces from an input faceted geometry.

FIG. 13 is a diagram 1300 in which, at 1310, data is received that includes a triangular mesh. Thereafter, at 1320, a curvature aligned cross field is generated on the triangular mesh. The cross field can be generated with a curvature alignment constraint. The cross field is used, at 1330, to calculate a quad layout which acts as a control cage of a subdivision surface. The vertex locations in the control cage are, at 1340, determined so that the subdivision surface approximates the triangular mesh. Subsequently, at 1350, at least a portion of the subdivision surface can be rendered in a graphical user interface.

Figure 14:
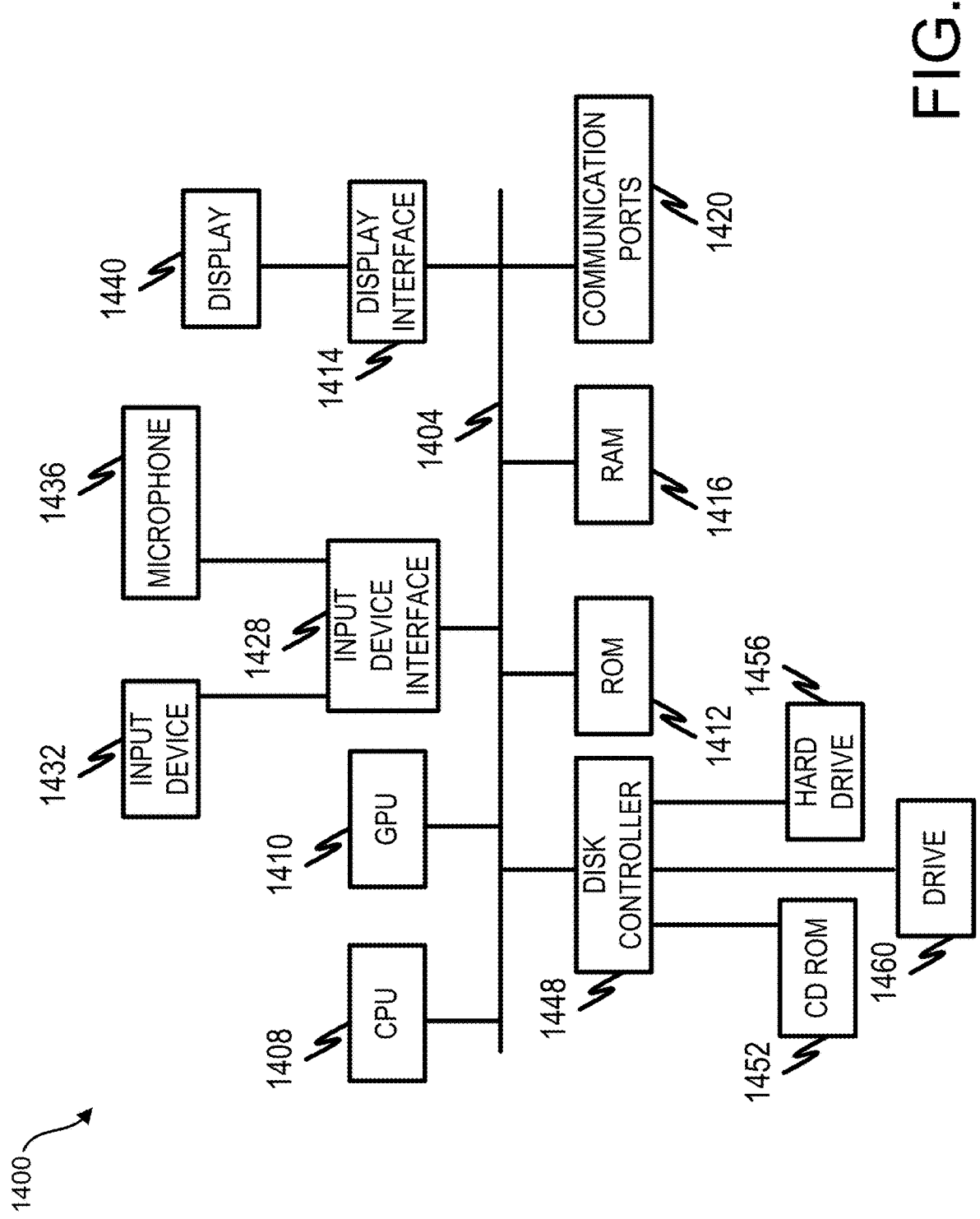
FIG. 14 is a diagram illustrating aspects of a computing device for implementing the current subject matter.

FIG. 14 is a diagram 1400 illustrating a sample computing device architecture for implementing various aspects described herein. A bus 1404 can serve as the information highway interconnecting the other illustrated components of the hardware. A processing system 1408 labeled CPU (central processing unit) (e.g., one or more computer processors/data processors at a given computer or at multiple computers), can perform calculations and logic operations required to execute a program or other operations. The processing system 1408 can include numerous cores/chips. A processing system 1410 labeled GPU (graphical processing unit) (e.g., one or more computer processors/data processors at a given computer or at multiple computers), can perform calculations and logic operations required to execute a program or other operations. A non-transitory processor-readable storage medium, such as read only memory (ROM) 1412 and random access memory (RAM) 1416, can be in communication with the processing system 1408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1448 can interface with one or more optional disk drives to the system bus 1404. These disk drives can be external or internal floppy disk drives such as 1460, external or internal CD-ROM, CD-R, CD-RW or DVD, or solid state drives such as 1452, or external or internal hard drives 1456. As indicated previously, these various disk drives 1452, 1456, 1460 and disk controllers are optional devices. The system bus 1404 can also include at least one communication port 1420 to allow for communication with external devices either physically connected to the computing system or available externally through a wired or wireless network. In some cases, the at least one communication port 1420 includes or otherwise comprises a network interface.

To provide for interaction with a user, the subject matter described herein can be implemented on a computing device having a display device 1440 (e.g., a CRT (cathode ray tube) or LCD (liquid crystal display) monitor) for displaying information obtained from the bus 1404 via a display interface 1414 to the user and an input device 1432 such as keyboard and/or a pointing device (e.g., a mouse or a trackball) and/or a touchscreen by which the user can provide input to the computer. Other kinds of input devices 1432 can be used to provide for interaction with a user as well; for example, feedback provided to the user can be any form of sensory feedback (e.g., visual feedback, auditory feedback by way of a microphone 1436, or tactile feedback);

and input from the user can be received in any form, including acoustic, speech, or tactile input. The input device 1432 and the microphone 1436 can be coupled to and convey information via the bus 1404 by way of an input device interface 1428. Other computing devices, such as dedicated servers, can omit one or more of the display 1440 and display interface 1414, the input device 1432, the microphone 1436, and input device interface 1428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving data comprising a triangular mesh;
generating a curvature aligned cross field on the triangular mesh;
calculating a quad layout using the cross field, the quad layout acting as a control cage of a subdivision surface;
iteratively refining the quad layout until an approximation tolerance is obtained, wherein, for each iteration, a maximum distance between the control cage and the triangular mesh is calculated, wherein the maximum distance is used to determine whether the approximation tolerance is obtained;
determining vertex locations in the control cage to result in the subdivision surface approximating the triangular mesh; and
causing at least a portion of the subdivision surface to be rendered in a graphical user interface.

2. The method of claim 1, wherein the approximation tolerance is user-generated.

3. The method of claim 1 further comprising:
augmenting the quad layout by adding one or more points at a location corresponding to the calculated maximum distance.

4. The method of claim 1, wherein the vertex locations are determined based on a comparison between the calculated maximum distance and a pre-defined threshold.

5. The method of claim 4 further comprising:
inserting a point into a location of the quad layout corresponding to the calculated maximum distance when the calculated maximum distance is outside the pre-defined threshold; and
creating a refined subdivision surface using the quad layout and the inserted point as the control cage.

6. The method of claim 5 further comprising:
receiving user-generated input via the graphical user interface specifying a location for the inserted point.

7. The method of claim 1, wherein the subdivision surface is based on a Catmull-Clark subdivision surface scheme.

8. A computer-implemented method comprising:
receiving data comprising a triangular mesh;
generating a curvature aligned cross field on the triangular mesh;
calculating an initial quad layout using the cross field and iteratively refining the quad layout as a control cage until a desired threshold is met based on a maximum distance between the control cage and the triangular mesh;
fitting the control cage to the triangular mesh by moving vertex locations in the control cage to result in a subdivision surface that approximates the triangular mesh; and
causing at least a portion of the subdivision surface to be rendered in a graphical user interface.

9. The method of claim 8 further comprising:
for each iteration, calculating the maximum distance between the control cage and the triangular mesh.

10. The method of claim 9, wherein the vertex locations are optimized when the calculated maximum distance is within a pre-defined threshold.

11. The method of claim 10 further comprising:
inserting a point into a location of the quad layout corresponding to the calculated maximum distance when the calculated maximum distance is outside the pre-defined threshold; and
creating a refined subdivision surface using the quad layout and the inserted point as the control cage.

12. The method of claim 11 further comprising:
receiving user-generated input via the graphical user interface specifying a location for the inserted point.

13. The method of claim 8, wherein the subdivision surface is based on a Catmull-Clark subdivision surface scheme.

14. A system comprising:
at least one data processor; and
memory storing instructions which, when executed by the at least one data processor, results in operations comprising:
receiving data comprising a triangular mesh;
generating a curvature aligned cross field on the triangular mesh;
calculating a quad layout using the cross field, the quad layout acting as a control cage of a subdivision surface;
iteratively refining the quad layout until an approximation tolerance is obtained based on a maximum distance between the control cage and the triangular mesh;
determining vertex locations in the control cage to result in the subdivision surface approximating the triangular mesh; and
causing at least a portion of the subdivision surface to be rendered in a graphical user interface.

15. The system of claim 14, wherein the approximation tolerance is user-generated.

16. The system of claim 15, wherein the operations further comprise:
for each iteration, calculating the maximum distance between the control cage and the triangular mesh.

17. The system of claim 16, wherein the vertex locations are determined based on a comparison between the calculated maximum distance and a pre-defined threshold.

18. The system of claim 17, wherein the operations further comprise:
inserting a point into a location of the quad layout corresponding to the calculated maximum distance when the calculated maximum distance is outside the pre-defined threshold; and
creating a refined subdivision surface using the quad layout and the inserted point as the control cage.

19. The system of claim 18, wherein the operations further comprise:
receiving user-generated input via a graphical user interface specifying a location for the inserted point.

20. The system of claim 19, wherein the subdivision surface is based on a Catmull-Clark subdivision surface scheme.

* * * * *